(12) United States Patent
Schumacher et al.

(10) Patent No.: US 8,561,391 B2
(45) Date of Patent: Oct. 22, 2013

(54) DETERMINATION OF A NOX AND SOOT EMISSION OCCURRING DURING THE OPERATION OF AN INTERNAL COMBUSTION ENGINE

(75) Inventors: Herbert Schumacher, Gerlingen (DE); Sebastian Wenzel, Ubstadt (DE)

(73) Assignee: Robert Bosch GmbH, Stuttgart (DE)

( * ) Notice: Subject to any disclaimer, the term of this patent is extended or adjusted under 35 U.S.C. 154(b) by 821 days.

(21) Appl. No.: 12/353,674

(22) Filed: Jan. 14, 2009

(65) Prior Publication Data
US 2009/0178388 A1    Jul. 16, 2009

(30) Foreign Application Priority Data
Jan. 14, 2008 (DE) .......... 10 2008 004 221

(51) Int. Cl.
*F01N 3/00* (2006.01)
(52) U.S. Cl.
USPC .......... 60/285; 60/274; 60/278; 60/295; 60/297; 60/301; 60/311
(58) Field of Classification Search
USPC .......... 60/274, 276, 278, 285, 295, 297, 301, 60/311
See application file for complete search history.

(56) References Cited

U.S. PATENT DOCUMENTS
2008/0010973 A1*  1/2008  Gimbres .......... 60/276

FOREIGN PATENT DOCUMENTS
DE    197 41 973    4/1999
DE    103 30 819    2/2005

* cited by examiner

*Primary Examiner* — Thomas Denion
*Assistant Examiner* — Diem Tran
(74) *Attorney, Agent, or Firm* — Merchant & Gould P.C.

(57) ABSTRACT

In order to very accurately ascertain the pollutant emission of the motor vehicle, which occurs during the operation of an internal combustion engine, without the use of complex measurement and test engineering, it is proposed, that during the operation of the internal combustion engine at least one cylinder pressure is in each case acquired at specifiable crankshaft angles, scanning values of a heating rate assigned to the acquired cylinder pressures are determined, the scanning values of the heating rate are provided to a specifiable model as input values, a crankshaft angle assigned to the initiation of combustion, an air/fuel ratio and an exhaust gas recirculation rate are ascertained and provided to the model as input values and the pollutant emission is determined as a function of the input values using the model.

16 Claims, 1 Drawing Sheet

DETERMINATION OF A NOX AND SOOT EMISSION OCCURRING DURING THE OPERATION OF AN INTERNAL COMBUSTION ENGINE

TECHNICAL FIELD

The invention relates to a method for determining a NOx and soot emission occurring during the operation of an internal combustion engine.

The invention additionally relates to a control unit for the open-loop and the closed-loop control of the operation of an internal combustion engine, the internal combustion engine being assigned an exhaust gas aftertreatment unit and means for ascertaining an air/fuel ratio and an exhaust gas recirculation rate.

The invention also relates to a computer program, which can be run on a computer, in particular in a control unit for the open-loop and closed-loop control of an internal combustion engine.

BACKGROUND

During the operation of an internal combustion engine, exhaust gases arise, which contain various pollutants. In diesel engines the main components of these pollutants are, for example, soot and nitric oxides (NOx). In order to comply with legal regulations with regard to admissible emissions of pollutants, the attempt is made on the one hand to already reduce the untreated emissions arising during combustion by means of engine modifications and on the other hand to achieve a second reduction of the pollutants contained in the exhaust gas by means of modifications outside of the engine. Diesel particle filters, NOx storage catalytic converters or SCR catalytic converters are employed, for example, as modifications outside of the engine. Besides an appropriate choice of the air/fuel mixture, an exhaust gas recirculation serves as an example of an engine modification.

In order to maintain an effective reduction of the soot and NOx emissions, it is necessary to ascertain a value, which describes the pollutant emission currently produced, already during the operation of the internal combustion engine. In so doing, the current soot and NOx emissions can, for example, already be ascertained during the operation of the internal combustion engine. Such items of information can then be used to detect the depletion of a diesel particle filter, respectively a NOx storage catalytic converter, and if need be control a regeneration of the diesel particle filter, respectively the NOx storage catalytic converter, in an open-loop, respectively closed-loop.

The emissions of pollutants of an internal combustion engine are dependent on regional parameters in the combustion chamber, as, for example, the regional air/fuel ratio or the maximum combustion temperature. These parameters can, however, only be measured using a special measurement and test engineering, as, for example, a rapid gas extraction valve or a so-called multi-spectral pyrometry. Such engineering is, however, not presently available in internal combustion engines and will not be available in the future in series production engines.

The arrangement of a measuring probe for the acquisition of a combustion radiation in an internal combustion engine is known from the German patent DE 103 30 819 A1. A combustion radiation emitted in the combustion of the internal combustion engine during the combustion of the air/fuel mixture is acquired by said probe, the combustion radiation being composed of various components, for example a soot radiation and an OH radiation. The radiation intensity is ascertained from a certain segment of the progression spectrum of the combustion radiation in the known method, the intensities of the soot radiation being ascertained in the range of 500 to 8000 nm, of the aldehyde bands at 375 to 385 nm and at 425 to 435 nm and of the OH radiation at 305 to 315 nm. For this purpose, the combustion radiation acquired by the measuring probe is supplied to a soot detector, an OH radiation detector and to a plurality of aldehyde detectors, which operate in certain wave ranges, for ascertaining the radiation intensity of the certain wave range. The intensities are additionally supplied to an evaluation unit, which ascertains if a homogeneous combustion prevails.

A test is made using the soot detector in the known method to determine whether a specified threshold value, which characterizes a homogeneous combustion, has been exceeded. If the threshold value has been exceeded, the mixture formation is accordingly manipulated by means of a control unit. Besides high costs for the required sensor system, the functional vulnerability of the sensors when exposed to contaminants and coating by soot is a disadvantage to this method. Moreover, in order to implement the method, application is complex.

Particularly the cylinder pressure initiated by the crankshaft angle, respectively the characteristic values derived from said pressure and their progressions, is basically suited for determining the soot and NOx emissions with the standard measurement instrumentation available in the motor vehicle. This can be attributed to the fact that the progression of the cylinder pressure is a state variable of the combustion. Said variable is essentially independent of region and describes the energy conversion in the cylinder of an internal combustion engine and consequently has a close correlation with the combustion.

A method for determining the soot concentration in self-igniting internal combustion engines using a neural network is known from the German patent DE 197 41 973 C1. In this regard the neural network is initially trained using learning data specifically intended for this purpose. This learning data is the input data representing the soot concentration. The input data comprises in particular variables characterizing the cylinder pressure, which, for example, consist of the maximum value of the cylinder pressure, the integral of the cylinder pressure versus a certain crankshaft angle or something similar. The temporal progression of the cylinder pressure, the combustion curve, the temperature curve and/or the burn-through function curve can however also be used as input data, said data being ascertained using a combustion curve calculation. Particularly the geometry of the piston and the combustion chamber, the engine rotational speed, the fuel/air ratio, residual gas and the initiation of combustion can also be used as additional input data.

After training the neural network, a neural network is available, which allows for a mapping of the selected items of input information to the soot concentration, wherein the correlations between the input variables and the soot concentration are contained and can accordingly be extracted. In so doing, the relevant characteristics of the input data are identified and there relevance can be appraised. The disadvantage with this is that only a few characteristics, which characterize the progression of the combustion, can be derived from the cylinder pressure progression in the known method.

The depositing of datasets into engine characteristic maps in a control unit, which controls the operation of the internal combustion engine in an open or closed loop, is also known from the German patent DE 197 41 973 C1. Items of information concerning the correlations between the input data and the measured values of the output variable, the soot concentration, are thereby described. These datasets are, for example, ascertained by means of complicated measurements in the internal combustion engine or from the combustion curve calculations.

It is the task of the invention to propose a possibility for determining the soot and NOx emissions, whereby the emissions can be ascertained using standard measurement and test engineering, a high degree of accuracy in the ascertainment being simultaneously achieved.

SUMMARY

The task is solved by a method of the type mentioned at the beginning of the application as a result of at least one cylinder pressure being acquired at specifiable crankshaft angles. For this purpose, a cylinder pressure sensor is, for example, disposed at one designated cylinder. Scanning values of a heating rate, which are assigned to the acquired cylinder pressures, are then determined. In so doing, the heating rate, which is assigned to a certain cylinder pressure, can, for example, be deposited in an engine characteristic map, a considerable amount of effort being required for the input of data into the engine characteristic map. The heating rate is therefore preferably calculated in real time from the cylinder pressure. In so doing, the so-called rapid heating law of Hohenberg can, for example, be used as a basis.

The scanning values of the heating rate are then provided as input values to a specifiable model, an emission of pollutants being able to be depicted as a function of heating rates as well as of additional input variables by means of the model.

In the method according to the invention, a crankshaft angle, which is assigned to the initiation of combustion, is acquired and likewise provided to the model as an input value. An air/fuel ratio and an exhaust gas recirculation rate are additionally ascertained and provided to the model as input values. Using the model, the pollutant emission is then determined as a function of the input values. Preferably a NOx emission or a soot emission is determined by means of the model. A plurality of further models tailored to various pollutant emissions can be employed parallel to the original model.

In order to accurately determine the heating rate, the heating progression from the initiation of combustion up until the termination of combustion is sub-divided into a finite number of discrete values so that a scanning value for the heating rate is assigned to each individual and discrete value of the crankshaft angle. These scanning values of the heating rate, which describe the shape of the heating rate, are together with the current air/fuel ratio, the current exhaust gas recirculation rate and the crankshaft angle at the initiation of combustion provided as input variables to the model for the ascertainment of the pollutant emission. An accurate scanning of the heating rate, which with sufficient accuracy reflects the shape of the heating rate, is achieved by this sub-division into a finite number of assigned crankshaft angles and by the calculation of the heating rate for each of these individual crankshaft angles. On the basis of the accurate mapping of the shape of the heating rate, a mathematical description of the heating rate is furthermore possible, which in turn can be used as a basis for the model for describing the pollutant emission. Because the combustion curve is described by the heating rate, an accurate determination of the pollutant emissions can be achieved by this accurate description of the heating rate.

The use of the fuel/air ratio and the exhaust gas recirculation rate as input variables for the model of the soot and NOx emissions is advantageous because fuel/air ratios, which correspond with each other, can be at least partially obtained by a change in the fuel quantity as well as by a change in the exhaust gas recirculation rate. The change in the fuel quantity displays however a different effect on the emission behavior of the internal combustion engine than the change in the exhaust gas recirculation rate; hence, the fuel/air ratio as well as the exhaust gas recirculation rate is taken into account as an input variable for the model for the pollutant emission.

The heating rate is a variable, which is derived from the cylinder pressure, for characterizing the combustion in the internal combustion engine. It is therefore possible in an advantageous configuration for the cylinder pressure to initially be measured for each individual value of the crankshaft angle. A pressure sensor, which is often already present in modern internal combustion engines, is advantageously used for the measuring. According to an advantageous embodiment, wherein the internal combustion engine has a plurality of cylinders, a pressure sensor is in each case assigned to each of the cylinders. A plurality of cylinder pressures is then acquired for each crankshaft angle, which has been designated by the invention. The heating rate can then be ascertained for each cylinder. In each case, an average value is however advantageously determined from the cylinder pressures acquired for a crankshaft angle. The heating rate is then determined as a function of this average value.

As a basic principle, arbitrary, so-called MISO (multiple input—single output) models are used in developing the model. According to a preferred embodiment, polynomials are especially used as the model approach. The model approach with polynomials provides the advantage that a high degree of accuracy has already thereby been achieved for ascertaining the pollutant emissions. At the same time, there is little complexity of calculation for a model approach using polynomials. If a higher degree of accuracy is to be achieved, the model can also advantageously be developed using a higher polynomial. A greater number of measurements is however then required. An increase in accuracy in a model implemented by means of a polynomial can also be achieved using a so-called Box-Cox-transformation. In so doing, a logarithmic transformation of the polynomial can, for example, be implemented.

According to another preferred embodiment, the model is implemented by means of a neural network. In order to be able to train the model for ascertaining the pollutant emissions as accurately as possible, in particular the soot and NOx emissions, a measurement of the input variables and the output variables for the model advantageously takes place across the entire engine-map range. In this connection, methods of the so-called statistical design of experiments (DOE=design of experiments) are used.

Cylinder pressures are advantageously acquired and scanning values for the heating rates are determined only for approximately 20 to 30 crankshaft angles from the initiation of combustion. At the most 25 scanning values are most preferably determined for the heating rates. A sufficiently accurate mapping of the relevant parts of the heating progression is thereby already possible. This is then especially the case if the crankshaft angles are present in equidistant steps, respectively the cylinder pressures and the scanning values of the heating rates are determined at equidistant crankshaft angles. It is particularly preferable for the crankshaft angles to be sub-divided into equidistant steps of 1° so that the heating rate is scanned for an interval comprising 25° from the initiation of combustion. Even if the combustion lasts longer than this interval comprising 25°, a sufficiently accurate determination of the pollutant emission is thereby assured using the model. This is true by virtue of the fact that the significance of the heating rate for the total emission drops for all further values outside of the interval.

Furthermore, provision can advantageously be made for an average value of the heating rates with regard to one of the intervals assigned to the crankshaft angle to be determined in order to ascertain the scanning value for the heating rates. In so doing, an accuracy, which is still sufficient, can be achieved in particular when relatively large steps are made between the crankshaft angles, which are being taken into account. The crankshaft angle range between the initiation of combustion and the termination of combustion is, for example, advantageously sub-divided into a number of intervals, whereupon an average value for the scanning values of the heating rates is in each case ascertained at least, for example, for the first 20 or 25 intervals. These average values are then used as input variables for the model.

In an advantageous configuration, the NOx and soot emissions, which were ascertained, are used as a reference value for ascertaining a current depletion of a diesel particle filter or a NOx storage catalytic converter. Furthermore, a regeneration point in time for a device for the exhaust gas aftertreatment, i.e., for example, a NOx storage catalytic converter or a soot particle filter, can be particularly advantageously determined with the model.

In internal combustion engines with a plurality of cylinders, an average value for the heating rates with regard to each individual cylinder can be established. That means that a separate scanning of the heating rates takes place for each cylinder, i.e. a corresponding scanning value for the heating rate is measured or ascertained for each individual cylinder. Because each scanning value of the heating rate is assigned to a certain value of the crankshaft angle, the average values of the measured, respectively ascertained, scanning values for the individual cylinders are established for the individual values of the crankshaft angle. These average values are then used as input variables for the model for ascertaining the pollutant emissions.

At least one actuating variable for the closed-loop control of the exhaust gas recirculation rate is advantageously ascertained on the basis of the pollutant emission, which was ascertained. A closed-loop control of the exhaust gas recirculation into the combustion chamber can thereby be achieved as a function of a current pollutant emission, for example a current NOx emission, whereby the pollutant emissions can in turn be favorably manipulated. The method according to the invention consequently thereby allows for an implementation of a so-called closed-loop control of the exhaust gas recirculation.

In an advantageous configuration, at least one actuating variable for the closed-loop control of the exhaust gas aftertreatment is ascertained by the evaluation unit on the basis of the NOx and soot emissions, which were ascertained. In so doing, the exhaust gas aftertreatment can take place by means of a diesel particle filter, a NOx storage catalytic converter or an SCR catalytic converter.

If an exhaust gas aftertreatment takes place by means of a diesel particle filter, the regeneration point in time of the diesel particle filter is ascertained on the basis of the soot emission ascertained by the model—as previously described above. In the case of an exhaust gas aftertreatment by means of a NOx storage catalytic converter, the regeneration point in time of a NOx storage catalytic converter is ascertained on the basis of the NOx emission. Finally in the case of an exhaust gas aftertreatment by a SCR catalytic converter, its closed-loop control takes place on the basis of the NOx emission.

The task is also solved by a control unit of the type mentioned at the beginning of the application as a result of the control unit having means for implementing the method according to the invention. In particular the control unit has an evaluation unit, which is designed for implementing the method according to the invention. For this purpose, the control unit can be programmed in a suitable manner.

The task is also solved by a computer program of the type mentioned at the beginning of the application as a result of the computer program being programmed to implement the method according to the invention. In so doing, the computer program likewise describes the invention just as the method according to the invention, for whose implementation the computer program is programmed.

Additional advantageous modifications and configurations of the method according to the invention are a result of the dependent claims and the following description.

BRIEF DESCRIPTION OF THE DRAWINGS

The invention is described below in detail using one of the examples of embodiment depicted in the figures. The following are shown.

DETAILED DESCRIPTION

Figure 1:
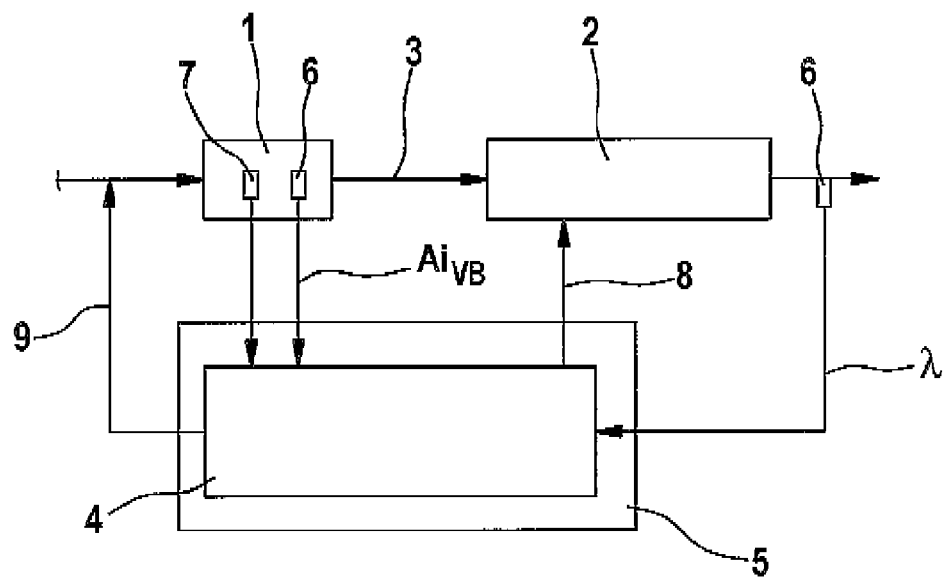
FIG. 1 is a schematic depiction of a preferred internal combustion engine, which is designed to implement the method according to the invention.

FIG. 1 shows a preferred example of embodiment of an internal combustion engine 1, a control unit 5 for the closed-loop control and the open-loop control of the internal combustion engine 1 being assigned to the internal combustion engine 1. An exhaust gas aftertreatment unit 2 is additionally assigned to the internal combustion engine 1. The exhaust gases of the internal combustion engine 1 are carried through a pipe 3 to the exhaust gas aftertreatment unit 2.

An evaluation unit 4, which is disposed in the control unit 5, is connected to the internal combustion engine 1 and the exhaust gas aftertreatment unit 2. Sensors denoted in their entirety with the reference numeral 6 are assigned to the internal combustion engine 1. Said sensors 6 acquire an air/fuel ratio $\lambda$ in the exhaust gas, an exhaust gas recirculation rate and a crankshaft angle at the initiation of combustion $Ai_{VB}$ during the operation of the internal combustion engine 1. The acquired values are then transmitted to the control unit 5 and in particular to the evaluation unit 4.

A plurality of crankshaft angles is determined in equidistant steps from the initiation of combustion $Ai_{VB}$ forward. For example, 25 steps, beginning from the initiation of combustion, are selected for each 1°. A plurality of other sub-divisions is, of course, conceivable. The first value for the sub-division is established by the measurement of the crankshaft angle KW at the initiation of combustion. The shape of the heating rate can thereby be described by means of a finite number of values for the crankshaft angle, a scanning value $Qi$ for the heating rate in the internal combustion engine 1 being acquired for each individual value of the 25 discrete values of the crankshaft angle. The current crankshaft angle is, for example, ascertained by means of a crankshaft angle sensor.

The cylinder pressure of a designated cylinder is additionally acquired by means of a pressure sensor 7. As was previously explained above, provision can also be made for a plurality of cylinder pressure sensors 7. Next the accompanying scanning values $Q_i$ for the heating rate are ascertained. This, for example, can be implemented by suitable software, which runs in the control unit. If provision is made for a plurality of pressure sensors, a heating rate, respectively a scanning value $Q_i$, can then initially be determined for each acquired cylinder pressure of any given cylinder. Subsequently an average value can be determined for the heating rates, which correspond to each other with respect to the crankshaft angles. It is likewise conceivable that an average value is initially established for the cylinder pressures, which correspond to each other with respect to the crankshaft angles, and the heating rate is subsequently determined for this average value and provided to the model. Cylinder pressures of different cylinders correspond to each other with respect to the crankshaft angle if said pressures have the same crankshaft angle relative to the initiation of combustion of the respective cylinder.

The evaluation unit 4 disposed in the control unit 5 than ascertains the pollutant emissions, for example the soot emission and the NOx emission, by means of the model stored in the control unit 5, so that $$[\text{soot, NOx}] = f(Q_i, Ai_{VB}, \lambda)$$

is valid, the air/fuel ratio $\lambda$, the exhaust gas recirculation rate, the crankshaft angle KW1 at the initiation of combustion $Ai_{VB}$ and the scanning value $Q_i$ for the heating rate HZ being used. The model for the soot and NOx emission is developed for the soot and NOx emissions by means of a polynomial set.

On the basis of the soot and NOx emissions of the internal combustion engine 1, which were calculated by means of the model, the evaluation unit 4 ascertains on the one hand actuating variables 8 for the closed-loop control of the exhaust gas aftertreatment unit 2 and on the other hand actuating variables 9 for the closed-loop control of the exhaust gas recirculation rate, which describes the percentage of the exhaust gas recirculated into the internal combustion engine 1 with respect to the gas content of the internal combustion engine 1. The actuating variable 9 for the closed-loop control of the exhaust gas recirculation rate acts, for example, in a suitable manner on an exhaust gas check valve. Depending on the type of exhaust gas aftertreatment, the actuating variable 8 for the exhaust gas aftertreatment brings about, for example, a regeneration of the exhaust gas aftertreatment unit 2.

Figure 2:
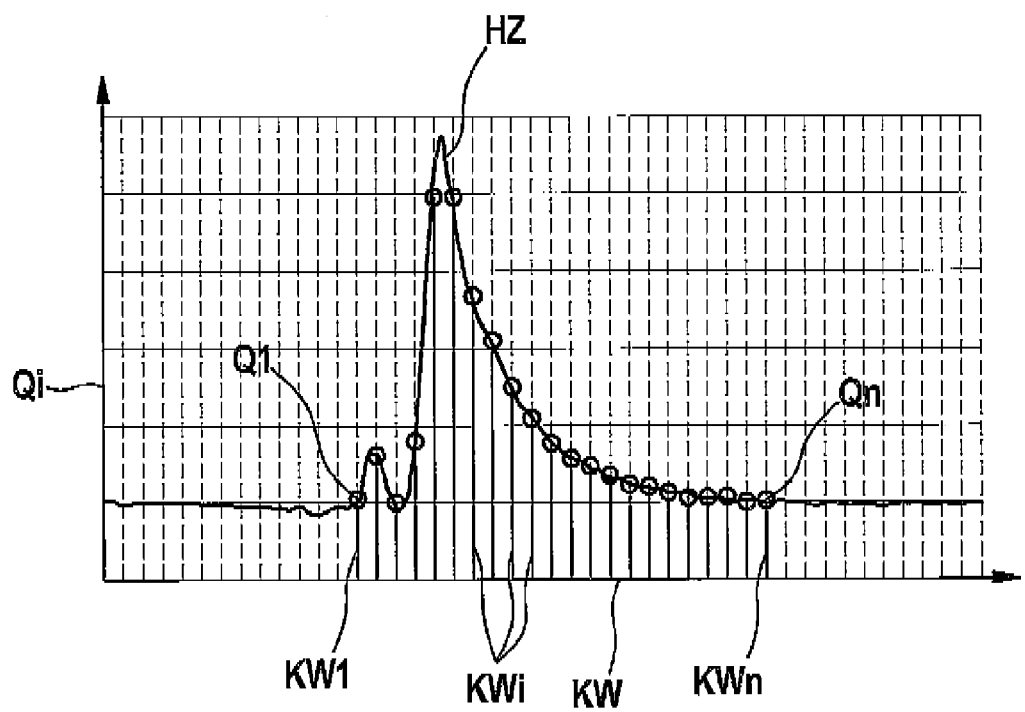
FIG. 2 is a progression of a heating rate during a combustion cycle.

In FIG. 2 a schematic depiction of the progression of the heating rate HZ as a function of the crankshaft angles KW, KW1, KWi, KWn is shown during combustion. The crankshaft angle KW1 at the initiation of combustion simultaneously denotes the starting point for the sub-division into equidistant steps with an interval distance of, for example, 1°. The sub-division of the crankshaft angle KW ends at the termination of combustion, which is denoted by KWn.

For example, for the first 20 or 25 crankshaft angles from the initiation of combustion forward, possibly also for all crankshaft angles between the initiation of combustion and the termination of combustion, a scanning value $Q_i$ for the heating rate HZ is ascertained during the operation of the internal combustion engine. Said scanning value is put as an input variable into the model for determining the soot and NOx emissions, whereby on the whole a determination of the pollutant emissions as a function of the heating rate and thereby also as a function of the cylinder pressure is possible.

For this purpose, the cylinder pressure is acquired using the sensor 7 at each of the crankshaft angles KWi and is transmitted to the evaluation unit 4. A heating rate associated with said pressure is then ascertained in the evaluation unit 4. This ascertainment can advantageously take place using an algorithm suited for this purpose, which makes a determination of the heating rate in real time possible. The heating rates are then provided as input values to the model for determining the pollutant emissions.

The invention claimed is:

1. A method of determining a pollutant emission occurring during operation of an internal combustion engine, the method comprising:
    acquiring, at a plurality of predetermined crankshaft angles, at least one cylinder pressure at each crankshaft angle;
    determining a plurality of scanning values of a heating rate, wherein the determining comprises sub-dividing a heating progression from an initiation of combustion until a termination of combustion into a finite number of discrete values, and wherein each scanning value is assigned to a respective acquired cylinder pressure, and wherein the scanning values of the heating rate are provided to a model as input values;
    acquiring a crankshaft angle assigned to an initiation of combustion, wherein said crankshaft angle is provided to the model as an input value;
    ascertaining an air/fuel ratio, wherein the air/fuel ratio is provided to the model as an input value;
    ascertaining an exhaust gas recirculation rate, wherein the exhaust gas recirculation rate is provided to the model as an input value; and
    determining the pollutant emission as a function of the input values of the plurality of scanning values of a heating rate, the crankshaft angle assigned to the initiation of combustion, the air/fuel ratio, and the exhaust gas recirculation rate using the model.

2. The method according to claim 1, wherein the pollutant emission describes one of: a NOx emission; a soot emission; or a NOx emission and a soot emission.

3. The method according to claim 1, further comprising acquiring the cylinder pressures at equidistant crankshaft angles.

4. The method according claim 1, wherein the crankshaft angle is sub-divided into steps of 1E.

5. The method according to claim 1, further comprising determining an average value for the heating rates with respect to an interval assigned to the crankshaft angle in order to ascertain the scanning value of the heating rate.

6. The method according to claim 1, further comprising acquiring a cylinder pressure at each of 20 to 30 crankshaft angles, preferably at each of 25 crankshaft angles, at least from the initiation of combustion, and a scanning value of the heating rate is determined for each of the crankshaft angles.

7. The method according to claim 1, further comprising implementing the model by a neural network.

8. The method according to claim 1, further comprising determining a depletion of an exhaust gas aftertreatment unit by means of the ascertained pollutant emission.

9. The method according to claim 1, wherein the internal combustion engine has a plurality of cylinders, and wherein only average values from the scanning values for the heating rate that are assigned to each of the plurality of cylinders are provided to the model.

10. The method according to claim 1, ascertaining at least one actuating variable for a closed-loop control of the exhaust gas recirculation rate on the basis of the ascertained pollutant emission.

11. The method according to claim 1, further comprising implementing the model by a quadratic or a higher order polynomial.

12. The method according to claim 11, further comprising transforming the polynomial by a Box-Cox transformation.

13. The method according to claim 1, ascertaining at least one actuating variable for a closed-loop control of an exhaust gas aftertreatment unit on the basis of the ascertained pollutant emission.

14. The method according to claim 13, wherein the at least one actuating variable describes a regeneration point in time of a diesel particle filter or a NOx storage catalytic converter.

15. A control unit for an open-loop and a closed-loop control of operation of an internal combustion engine, wherein an exhaust gas aftertreatment unit is assigned to the internal combustion engine, the control unit comprising:
   an evaluation unit, wherein a pollutant emission is determined by the evaluation unit that is configured to implement a method of determining the pollutant emission occurring during operation of the internal combustion engine, the method comprising: acquiring, at a plurality of predetermined crankshaft angles, at least one cylinder pressure at each crankshaft angle;
   determining a plurality of scanning values of a heating rate, wherein the determining comprises sub-dividing a heating progression from an initiation of combustion until a termination of combustion into a finite number of discrete values, and wherein each scanning value is assigned to a respective acquired cylinder pressure, and wherein the scanning values of the heating rate are provided to a model as input values; acquiring a crankshaft angle assigned to an initiation of combustion, wherein said crankshaft angle is provided to the model as an input value;
   ascertaining an air/fuel ratio, wherein the air/fuel ratio is provided to the model as an input value;
   ascertaining an exhaust gas recirculation rate, wherein the exhaust gas recirculation rate is provided to the model as an input value; and determining the pollutant emission as a function of the input values of the plurality of scanning values of a heating rate, the crankshaft angle assigned to the initiation of combustion, the air/fuel ratio, and the exhaust gas recirculation rate using the model.

16. A non-transitory computer readable medium having stored thereon computer-executable instructions, the computer-executable instructions for an open-loop and a closed-loop control of operation of an internal combustion engine, wherein the computer-executable instructions cause a control unit that executes the instructions to implement a method of determining the pollutant emission occurring during operation of the internal combustion engine, the method comprising: acquiring, at a plurality of predetermined crankshaft angles, at least one cylinder pressure at each crankshaft angle; determining a plurality of scanning values of a heating rate, wherein the determining comprises sub-dividing a heating progression from an initiation of combustion until a termination of combustion into a finite number of discrete values, and wherein each scanning value is assigned to a respective acquired cylinder pressure, and wherein the scanning values of the heating rate are provided to a model as input values; acquiring a crankshaft angle assigned to an initiation of combustion, wherein said crankshaft angle is provided to the model as an input value; ascertaining an air/fuel ratio, wherein the air/fuel ratio is provided to the model as an input value; ascertaining an exhaust gas recirculation rate, wherein the exhaust gas recirculation rate is provided to the model as an input value; and determining the pollutant emission as a function of the input values of the plurality of scanning values of a heating rate, the crankshaft angle assigned to the initiation of combustion, the air/fuel ratio, and the exhaust gas recirculation rate using the model.

* * * * *